Figure 1:
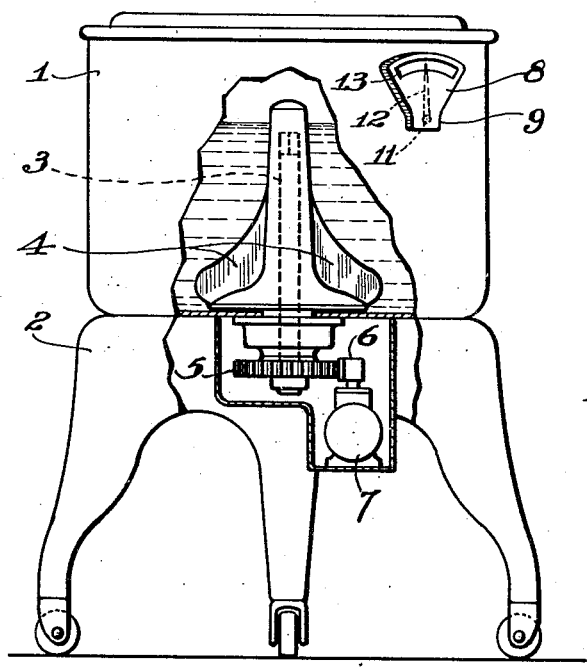

Aug. 6, 1940.  W. R. DAVIS  2,210,851
WASHING MACHINE
Filed Aug. 11, 1938

WITNESSES
A B Wallace.
E. O. Johns

INVENTOR.
Wilmer R. Davis
BY Brown, Critchlow & Flick
his ATTORNEYS.

Patented Aug. 6, 1940

2,210,851

UNITED STATES PATENT OFFICE 2,210,851

WASHING MACHINE

Wilmer R. Davis, Pittsburgh, Pa.

Application August 11, 1938, Serial No. 224,253

2 Claims. (Cl. 68—13)

My invention is concerned with improvements in the washing of clothes, linens, etc., and more particularly it relates to means for indicating to the operator the amounts of water and wash used in the process of washing.

In the employment of mechanical washing machines which perform the act of washing without assistance from the operator, the quality and completeness of the washing have been found in large measure to depend upon the volume of water and weight of wash placed in the tub. With an excessive volume of water a given weight of wash is raised too far above the actuating mechanism and is not sufficiently turned over or flung about. With relatively little water, on the other hand, a given amount of wash becomes too compact a mass for good washing. Similarly, with a given volume of water best results are achieved when a specific weight of wash is used. Thus for each washing machine there is one specific combination of water and wash which is to be desired; for one machine it may be 17 gallons of water and 7½ pounds of wash, for another perhaps 18 gallons and 9 pounds.

While for each machine this desired combination has long been known, in the past there has been no easy and convenient manner by which the ordinary operator could reproduce it. The usual means provided for indicating when the desired volume of water was obtained has been a small bead or mark upon the inside of the tub. Such a device has been difficult to see, if not in many cellars completely invisible, and its use has been physically inconvenient. For determining the weight of wash actually charged into the water in the tub, no practicable means has ever been provided. To weigh each batch individually has been entirely unsatisfactory, scales being expensive and their operation increasing and lengthening the already heavy task of the housewife or laundress. The consequent effect has been that the average housewife merely put in water and wash until, to her eye, the mixture seemed correct and rarely achieved that combination of water and wash productive of the best results.

Accordingly it is one object of my invention to provide washing machines with an indicator which conveniently and accurately points out when the tub contains the desired volume of water.

It is a further object of my invention to provide them with an indicator which conveniently and accurately points out when the desired weight of wash has been added to the water.

I have found by experiment that the electrical energy required by the motor in driving the agitating mechanism of a given machine is always roughly identical for the same volumes of water, and also that, with differing volumes of water, the requisite current or power varies appreciably. From these facts it follows that an indicator governed as to position by the electrical requirements of the motor accurately reflects the volume of water in the tub at that moment; so that, by placing an electrical measuring device, such as the mechanism of a wattmeter or ammeter, in the motor circuit and causing this device to actuate an indicator, such as a pointer moving over a properly calibrated scale, I am enabled to provide means for accurately indicating when a desired volume of water has been poured in.

Similarly, I have found by experiment that, when wash is charged into water already in a tub, the resulting increment of electrical power or current drawn by the motor accurately reflects the weight of wash so added. And since these increments are of some magnitude, it follows that an electrical measuring device in the motor circuit and an indicator actuated by said device compose means for accurately pointing out when a desired weight of wash has been added to the tub water.

Figure 2:
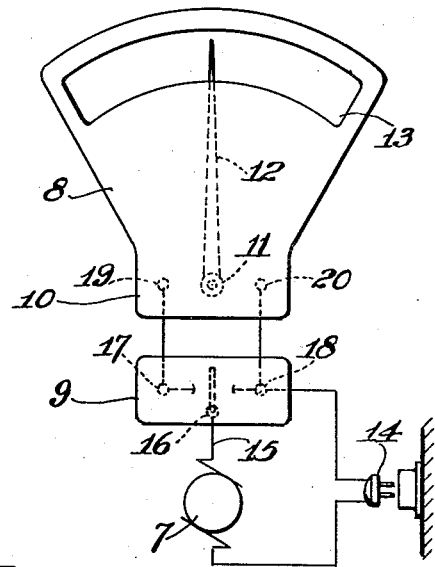

My presently preferred embodiment of this invention is disclosed in the accompanying drawing of which Fig. 1 is a general elevational view of a washing machine, partly in section; Fig. 2 a schematic electrical circuit; and Figs. 3 and 4 elevations of calibrated scales for use with my indicating device.

Fig. 1 represents an ordinary household washing machine, in which a metallic tub 1 is rigidly supported upon a metallic standard 2. A spindle 3, journaled vertically through the bottom of tub 1, has extending from the periphery of its upper part a plurality of activating blades 4 and has rigidly attached upon its lower end an external pinion 5. Meshing with pinion 5 is a rack bar 6 which rocks pinion 5 and spindle 3 back and forth and is in turn reciprocated by motor 7 through suitable pinions and cranks which need not be shown, since they are common means and are not part of my invention. Fixed upon the outside of tub 1 is my new indicator 8 and a small electric snap-switch 9, both of which will be more fully described hereinafter. It is obvious that the exact location of these two members is purely a matter of choice and design, but I prefer, for the sake of convenience, to place them as shown.

Indicator 8 is more accurately disclosed in Fig. 2. An electrical measuring device 10, such as the motor of an ordinary ammeter, acts through a rotatable spindle 11 to turn an indicating arm 12, rigidly attached to the end of spindle 11. This arm 12 is thus caused to pass backwards and forwards over a calibrated scale 13, and the arcuate distances of its travel are, of course, exactly governed by the current passing through measuring device 10.

Fig. 2 also discloses the electrical circuit with which I now connect indicator 8 and switch 9 into the motor circuit. One terminal of motor 7 is directly connected with a power supply 14, usually a wall socket, while from the other terminal a wire 15 leads to a common terminal 16 of snap-switch 9. On the other side of said switch, terminals 17 and 18 are connected to terminals 19 and 20, respectively, of indicator 8, while terminal 19 is also directly connected to power supply 14. In this way indicator 8 may be cut in or out of the motor circuit as the operator may desire, by putting snap-switch 9 in contact with either terminal 17 or 18. Naturally other equally efficacious circuits may be used, as will be understood by those skilled in this art. Thus snap-switch 9 may be omitted, or a somewhat differently acting one substituted. Or, with minor changes the circuit may be adapted for use with an electrical measuring device 8 constructed upon the principles of the wattmeter or voltmeter. Many such circuits are in accord with standard electrical practice, with the consequence that the circuit disclosed in Fig. 2 is intended to serve merely by way of example.

Figure 3:
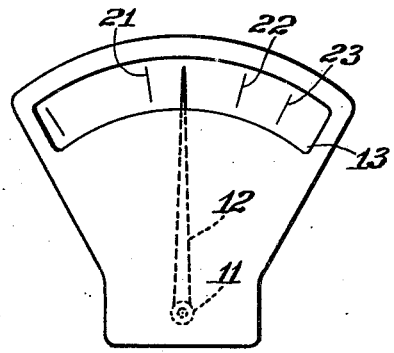

Scale 13, as shown in Fig. 3, has upon it one line 21, to which arm 12 points while spindle 3 is being rocked back and forth in an empty tub. As water is poured into tub 1, and the electrical requirements of motor 7 increase, arm 12 is gradually advanced until a line 22 on scale 13 is reached, by which event the operator is informed that she has placed in the tub exactly that volume of water, say 18 gallons, specified by the manufacturer, and consequently she ceases to fill the tub. Then as she adds wash and the load on the motor further increases, arm 12 is advanced still farther along scale 13 until, by pointing to a line 23, it informs the operator that exactly the specified weight of wash, say 7½ pounds, has been reached.

Figure 4:
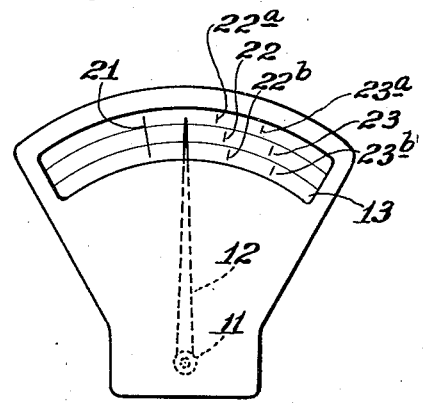

While the scale just described enables the operator to achieve the specific combination of water and wash, say, 18 gallons and 7 pounds recommended by the manufacturer as productive of the optimum, the operator often desires to diverge materially from it; she may be rushed and desire to overload the machine with 8 pounds; she may have but little wash and desire to operate it lightly with but 3 pounds. In the past she has had but the sheerest guesswork to guide her to that new combination of water and wash, by which the best results could be attained under these abnormal conditions; also she has had to create a new mixture by eye. To alleviate this difficulty, I employ a scale, as shown in Fig. 4, which has upon it lines for use with several combinations of water and wash. If the operator desires to achieve the best results, she, of course, uses the recommended combination of water and wash, say, 18 gallons and 7½ pounds, and, pouring in water until arm 12 reaches line 22 and adding wash till it reaches line 23, she achieves this optimum. However, to overload the machine to, say, 8½ pounds of wash, she adopts scale (a), and, pouring in water till arm 12 reaches line 22a and adding wash till it reaches line 23a she achieves not the very best results, but what have been found to be the best possible when the machine is so overloaded. Between 8½ and 7½ she must interpolate, unless other scales are added. On the other hand, when desiring to use but, say, 5 pounds of wash, she adopts scale (b), and, pouring in water till arm 12 reaches line 22b and adding wash till it reaches line 23b, she again achieves, not the optimum, but the best results under the circumstances; and, for other weights she must interpolate unless more scales are added.

Obviously scale 13 may be reproduced with innumerable variations to suit the desires of any manufacturer or operator. Thus, for example, it may be marked to indicate weights of wash alone, while leaving the operator to use the old type marks upon the tub in determining volumes of water. Also, there must be a different calibration for each machine which has different performance characteristics, but master scales may easily be developed by experiment and copies readily struck off for all similarly acting machines.

Moreover, while I have thus described indicator 8 as having a rotatable indicating arm and a fixed scale, it is apparent that simple mechanical adjustments could produce one having a fixed indicating point and a movable scale.

The useful advantages of this improvement are apparent. Much inconvenience is removed from the task of determining when the specified volume of water has been obtained, for the operator need only watch the moving arm of an indicator. Both inconvenience and inaccuracy are removed from the task of determining the weight of wash, for the operator merely drops articles into the water until the indicator arm points out that she has the correct amount. Time and effort are both saved, while accuracy is obtained. Moreover, when she desires to depart somewhat from these specified combinations of water and wash, the operator is enabled by a properly calibrated scale to achieve the next best conditions. Likewise the manufacturer can now sell a machine with some assurance that it will be used under the best performance conditions.

According to the provisions of the patent statutes, I have explained the principle and construction of my invention, and have illustrated and described what I now consider to represent its best embodiment. However, I desire to have it understood that, within the scope of the appended claims, the invention may be practiced otherwise than as specifically illustrated and described.

I claim:

1. In a washing machine, the combination of a tub, an agitating mechanism, an electric driving motor operatively connected to said agitating mechanism, an electric circuit adapted to connect the motor to a supply of electric current, and an electrically operated indicator which is connected in the electric circuit to said motor, said indicator being calibrated to show, first, the volume of water in said tub and being separately calibrated to show thereafter the weight of wash added to the water.

2. In a washing machine, the combination of a tub, an agitating mechanism, an electric driving motor operatively connected to said agitating mechanism, an electric circuit adapted to connect the motor to a supply of electric current, and an electrically operated indicator connected in the electric circuit to the motor, said indicator having calibration marks to show when the proper weight of wash is added to various ascertained amounts of water in said tub.

WILMER R. DAVIS.